United States Patent [19]

Dunn

[11] Patent Number: 5,020,396
[45] Date of Patent: Jun. 4, 1991

[54] CHAIN LUMPER

[76] Inventor: Mark M. Dunn, 4462 S. 1720 West, Roy, Utah 84067

[21] Appl. No.: 281,742

[22] Filed: Feb. 17, 1989

[51] Int. Cl.$^5$ .............................................. B60C 27/06
[52] U.S. Cl. ................................................... 81/15.8
[58] Field of Search ........................................ 81/15.8

[56] References Cited

U.S. PATENT DOCUMENTS

| | | | |
|---|---|---|---|
| 1,378,606 | 5/1921 | Noonan | 81/15.8 |
| 1,409,025 | 3/1922 | Rawlins | 81/15.8 |
| 1,426,268 | 8/1922 | Flugel | 81/15.8 |
| 1,597,549 | 8/1926 | Siegel | 81/15.8 X |
| 3,408,884 | 11/1968 | Musgrove | 81/15.8 |
| 4,703,675 | 11/1987 | Dalaba | 81/15.8 |

FOREIGN PATENT DOCUMENTS 566679  9/1957  Italy .................................. 81/15.8

Primary Examiner—James G. Smith

[57] ABSTRACT

A device for installing tire chains having an elongate tube for insertion through wheel holes of trucks and buses, having a wire rope installed in the tube and formed to provide a loop at each end, and an additional loop at a central point extending out from the tube through a hole in its wall. Hooks are provided on each loop for attaching one end of the tire chain, so that the tire may then be rotated to wind the chain around it, after which the installation device is removed and the ends of the chains fastened together in the normal manner.

2 Claims, 1 Drawing Sheet

CHAIN LUMPER

BACKGROUND OF THE INVENTION

1. Field

The field of the invention is devices and methods for installation of traction chains upon vehicle tires, and more particularly such tires arranged in pairs as on trucks and buses.

2. State of the Art

Heretofore, two methods have been commonly used to install tire chains upon sets of truck and bus tires. The first involves laying the chain spread out upon the ground so that the truck can be driven thereon into position for connection of the ends of the chain assembly together to secure it about the tire. This method is impossible to use when the vehicle is mired unmovably in mud or upon ice. Even if the vehicle can be driven, positioning of the vehicle tires upon the chain sufficiently accurately is difficult at best, and always highly irritating.

The second method involves jacking the vehicle above the ground and manually placing the chain in the proper position wound around the tires into end hooked position. This is a very disagreeable task because of the general befouled condition of the tires and chains. Clearly, there is need for a device that will permit the ready installation of tire chains about dual tire sets, without jacking up of the vehicle or its maneuvering upon the chain.

BRIEF SUMMARY OF THE INVENTION

With the foregoing in mind, the present invention eliminates or substantially alleviates the shortcomings and disadvantages in the prior art traction chain installation devices for the tires of dual wheeled trucks, buses and the like. An elongate substantially rigid member is provided adapted to be installed through the openings in the wheel of the truck for example, having at each of its ends and at its midpoint provisions for temporary attachment of one end of the traction chain assembly. Preferably, the elongate member is tubular and the attaching means comprises a substantially flexible member which is placed in the tubular member and is formed into a loop extending from each end thereof. An additional loop is formed of the member extending outward from an aperture provided through the wall of the tube at its midpoint. The end of the traction chain is then hooked to these loops at both sides and in the center, and the wheel caused to rotate, either by driving the vehicle, or by causing it to spin if it is in mired condition. When the wheel is in proper position, the chain may be unhooked from the loops and its ends hooked together, the elongate member then being removed from the wheel.

It is therefore the main object of the invention to provide a device which will enable tire chains to be installed about tires simply and easily with a minimum of effort, whether or not it is possible to move the vehicle, and without the necessity of jacking the vehicle. It is a further object to provide such a device in an economical and simple embodiment. Other important objects and advantages will become apparent from the following detailed description.

BRIEF DESCRIPTION OF THE DRAWINGS

In the drawings, which represent the best mode presently contemplated for out the invention.

DETAILED DESCRIPTION OF ILLUSTRATED EMBODIMENTS

Figure 1:
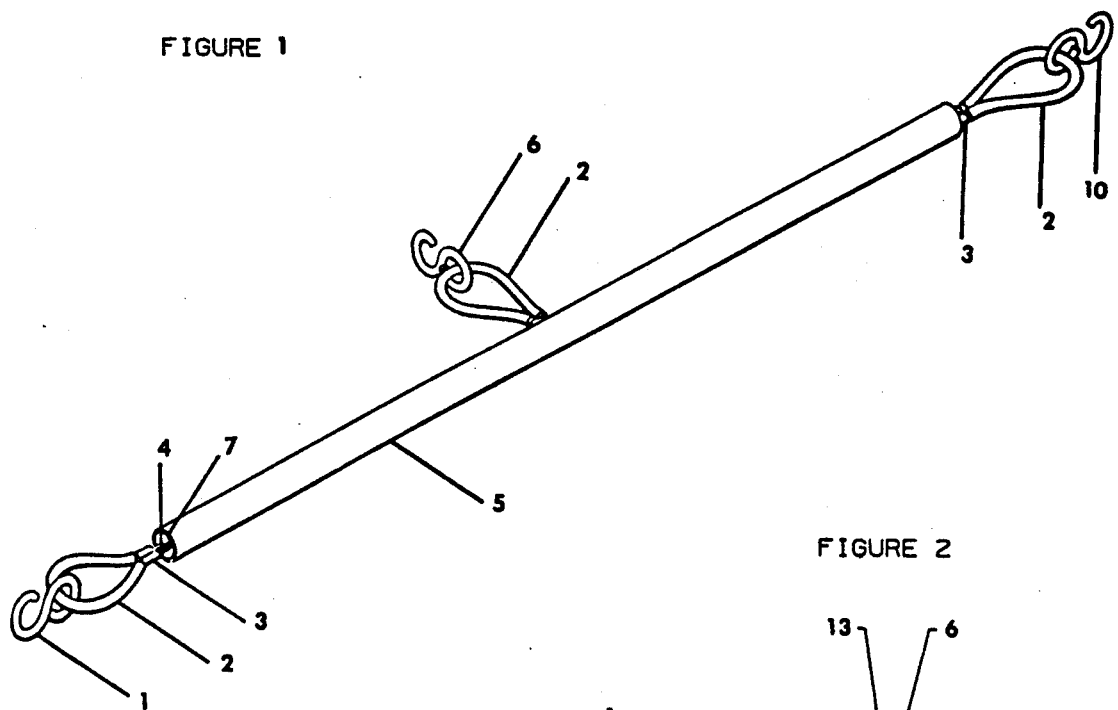
FIG. 1 is a perspective drawing of a chain lumper in accordance with the invention, drawn to a reduced scale, FIG. 2 an elevation view of the invention shown in use installing a traction chain assembly about a dual tired wheel of a bus, truck or the like, drawn to a smaller scale than the scale of FIG. 1, and FIG. 3 an elevation view of the chain lumper in use at an intermediate point during the installation of a traction chain about the tires of a truck or the like, drawn to the scale of FIG. 2.
Figure 2:
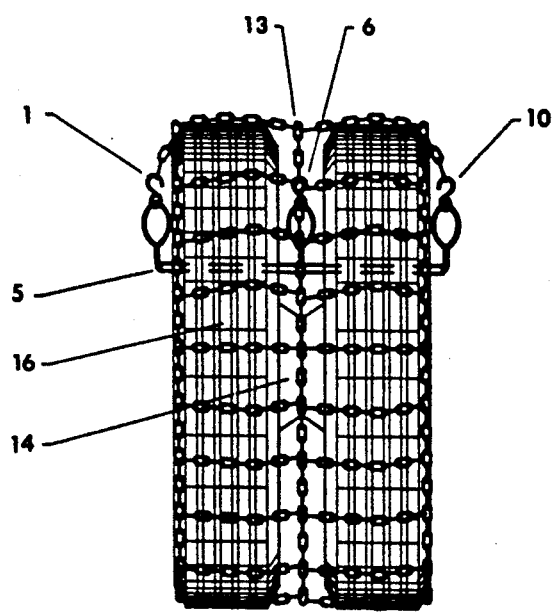

Referring first to FIG. 1, chain lumper 5 in accordance with the invention is seen to comprise an elongate tubular member 7, of a length somewhat greater than that of a dual tire assembly, as seen in FIG. 2. An aperture, not shown, is provided at the midpoint of tube 7. A continuous length of flexible wire rope 4 is disposed in tube 7, formed to create a loop extending from each of its ends and a third loop extending outward through the aperture in its wall. Metallic clamps 3 may be employed to secure the loops, and a length of plastic tubing 2 may be utilized covering the rope of each loop. "S" hooks 1, 6 and 10 are attached, one to each of the three loops.

Figure 3:
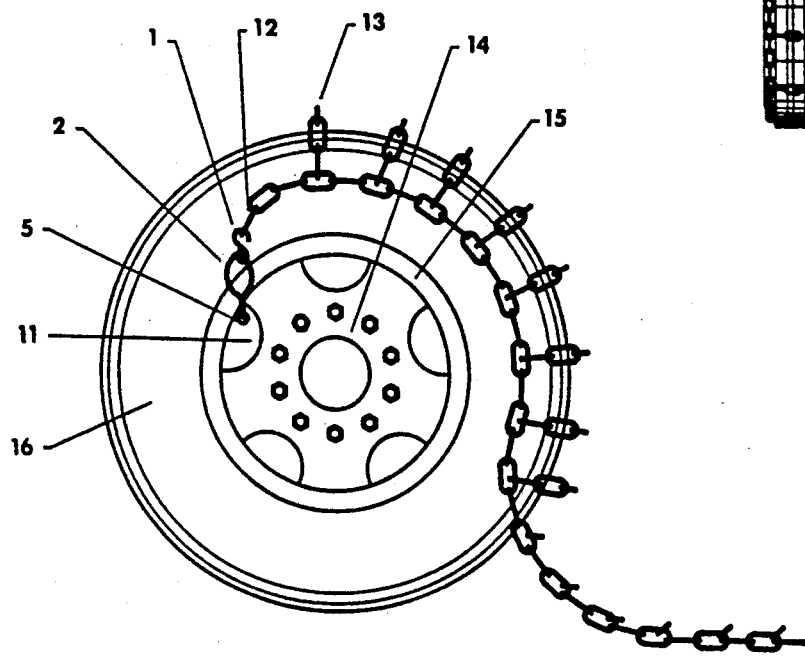

The wheels upon which the dual tires 16 are mounted comprise a web or hub 15 having a number of holes spaced radially outward from axle 14. Chain lumper 5 is inserted through one of the holes 11 which may be accessible. (FIGS. 2 and 3) One end of tire chain assembly 13 is then engaged to hooks 1, 6 and 10, at its outside, center and inside rail respectively. Chain assembly 13 is then laid stretched along the ground in line with the tires. (FIG. 3)

Tires 16 are then rotated about axle 14 by driving the vehicle a short distance until chain assembly 13 is wound about the tires. If the tires 16 are on ice or the like without traction with the ground, it is often possible to cautiously rotate the tires about axle 14, winding chain assembly 13 in this manner. In either event, the chains are removed from attachment to hooks 1, 6 and 10 and its ends attached together to complete the installation. Chain lumper 5 is then retracted from the hole 11 and stored for later use.

The invention may be embodied in manners that are not specifically illustrated herein while not departing from the the spirit of the invention. Tube 7 may be of any sufficiently rigid and strong material, of course. Nor is the invention necessarily limited for use with a single pair of dual tires, since it could be lengthened as necessary to accommodate three, four or more tires mounted upon a single wheel assembly adjacent to each other affixed to rotate together.

The invention may be embodied in other specific forms without departing from the spirit or essential characteristics thereof. The present embodiments are therefore to be considered as illustrative and not restrictive, the scope of the invention being indicated by the appended claims rather than by the foregoing description, and all changes that come within the meaning and range of equivalency of the claims are therefore intended to be embraced therein.

What is claimed and desired to be secured by United States Letters Patent is:

1. A tire chain applying tool for applying tire chains to one or more tires mounted on wheels in a set comprising:

an elongated tube-like member having an opening transverse to the axis of the elongated tube-like member spaced equidistant from both ends of the elongated tube-like member;

an elongated flexible member passing from one end of the elongated tube-like member continuously through the opening and on through the other end of the elongated tube-like member;

portions of the elongated flexible member extending from the one end, the opening, and the other end being formed into loops to prevent the elongated flexible member from dislodging from the elongated tube-like member;

hook means secured to each of the formed loops;

wherein the tool is placed internally of the wheels and the tire chain is secured to each of the hooks so that upon rotation of the tire and wheel, the tire chain is wound onto the tire.

2. A tire chain applying tool as claimed in claim 1 wherein the spacing between one end of the elongated tube-like member and the opening is approximately the width of the tire plus the width of a wheel hub.

* * * * *